US012662001B2

(12) United States Patent
Takahashi et al.

(10) Patent No.: US 12,662,001 B2
(45) Date of Patent: Jun. 23, 2026

(54) CONTROL SYSTEM FOR VEHICLE

(71) Applicants: MITSUBISHI JIDOSHA KOGYO KABUSHIKI KAISHA, Tokyo (JP); The University of Tokyo, Tokyo (JP)

(72) Inventors: Naoki Takahashi, Tokyo (JP); Hiroshi Fujimoto, Tokyo (JP); Hiroyuki Fuse, Tokyo (JP); Ryota Takahashi, Tokyo (JP); Yutaro Okamura, Tokyo (JP); Ryosuke Koga, Tokyo (JP); Tetsuya Furuichi, Tokyo (JP); Akira Maruyama, Tokyo (JP)

(73) Assignees: MITSUBISHI JI DOSHA KOGYO KABUSHIKI KAISHA, Tokyo (JP); THE UNIVERSITY OF TOKYO, Tokyo (JP)

( * ) Notice: Subject to any disclaimer, the term of this patent is extended or adjusted under 35 U.S.C. 154(b) by 218 days.

(21) Appl. No.: 18/572,422

(22) PCT Filed: Aug. 1, 2022

(86) PCT No.: PCT/JP2022/029413
§ 371 (c)(1),
(2) Date: Dec. 20, 2023

(87) PCT Pub. No.: WO2023/013564
PCT Pub. Date: Feb. 9, 2023

(65) Prior Publication Data
US 2024/0286492 A1 Aug. 29, 2024

(30) Foreign Application Priority Data
Aug. 6, 2021 (JP) ................................. 2021-129861

(51) Int. Cl.
| | | |
|---|---|---|
| *B60L 15/20* | (2006.01) | |
| *B60K 1/02* | (2006.01) | |
| *B60K 23/04* | (2006.01) | |

(52) U.S. Cl.
CPC ............ *B60L 15/2036* (2013.01); *B60K 1/02* (2013.01); *B60K 23/04* (2013.01); (Continued)

(58) Field of Classification Search
CPC ........... B60L 15/2036; B60L 2240/421; B60L 2240/423; B60L 2240/461; B60L 2220/42; (Continued)

(56) References Cited

U.S. PATENT DOCUMENTS

| | | | | |
|---|---|---|---|---|
| 9,802,509 B2 * | 10/2017 | Matsushima | ........... | B60L 50/16 |
| 10,597,041 B2 * | 3/2020 | Suzuki | .................... | H02P 29/00 |

(Continued)

FOREIGN PATENT DOCUMENTS

| | | |
|---|---|---|
| JP | 4637136 B2 | 2/2011 |
| JP | 2021-72752 A | 5/2021 |

(Continued)

OTHER PUBLICATIONS

WO_2015033861 translation (Year: 2025).*

(Continued)

*Primary Examiner* — Jelani A Smith
*Assistant Examiner* — Paul A Castro
(74) *Attorney, Agent, or Firm* — Birch, Stewart, Kolasch & Birch, LLP

(57) ABSTRACT

A control system for a vehicle (1) provided with a differential mechanism (3) that applies a torque difference to left and right wheels (5) and two electric motors (2) coupled to the differential mechanism (3), the control system including: two control units (11, 12) being connected to each other via (Continued)

START

OBTAIN DEMANDED TORQUES FROM SUPERORDINATE ECU — S30

OBTAIN DETECTION SIGNALS OF LEFT AND RIGHT ROTATION SPEED SENSORS — S31

ROTATION SPEED PROCESSING — S32

CARRY OUT WHEEL VELOCITY CONTROL — S33

CARRY OUT AXLE TORQUE CONTROL — S34

FAIL MONITORING — S35

TRANSMIT ASSIGNED TORQUE OF COUNTERPART MOTOR — S36

RECEIVE ASSIGNED TORQUE OF CONTROLLING MOTOR — S37

SYNCHRONOUS CONTROL — S38

INDEPENDENTLY CONTROL LEFT AND RIGHT MOTORS — S39

RETURN high-speed communication means and each controlling one of the two electric motors (2); a first rotation speed sensor (26R) that detects a first rotation speed of a first electric motor (2R) of the two electric motors (2) and outputs the first rotation speed to the two control units (11, 12); a second rotation speed sensor (26L) that detects a second rotation speed of a second electric motor (2L) of the two electric motors (2) and outputs the second rotation speed to the two control units (11, 12); and a superordinate control unit (10) that calculates demanded torques of the two electric motors (2) based on vehicle information of the vehicle (1). At least a first control unit of the two control unites (11, 12) calculates two assigned torques to achieve the demanded torques calculated in the superordinate control unit (10) based on detection signals of the two rotation speed sensors (26R, 26L).

7 Claims, 11 Drawing Sheets

(52) U.S. Cl.
CPC ... *B60K 2023/043* (2013.01); *B60L 2240/421* (2013.01); *B60L 2240/423* (2013.01); *B60L 2240/461* (2013.01)

(58) Field of Classification Search
CPC ........... B60L 15/20; B60K 1/02; B60K 23/04; B60K 2023/043; F16H 2048/106; F16H 2048/204; F16H 2048/364; F16H 48/10; F16H 48/36
See application file for complete search history.

(56) References Cited

U.S. PATENT DOCUMENTS

| 11,850,949 | B2 * | 12/2023 | Gusyev | B60W 10/08 |
|---|---|---|---|---|
| 2009/0038866 | A1 | 2/2009 | Abe et al. | |
| 2016/0176313 | A1 * | 6/2016 | Li | B60L 50/51 701/22 |
| 2018/0237014 | A1 * | 8/2018 | Nasu | B60W 10/02 |
| 2022/0274598 | A1 | 9/2022 | Miyamoto et al. | |

FOREIGN PATENT DOCUMENTS

| WO | WO-2015033861 A1 * | 3/2015 | B60L 15/20 |
|---|---|---|---|
| WO | WO 2021/075415 A1 | 4/2021 | |

OTHER PUBLICATIONS

Extended European Search Report for European Application No. 22852983.0, dated Sep. 30, 2024.
International Search Report, issued in PCT/JP2022/029413, PCT/ISA/210, dated Sep. 27, 2022.
Written Opinion of the International Searching Authority, issued in PCT/JP2022/029413, PCT/ISA/237, dated Sep. 27, 2022.
International Preliminary Report on Patentability and English translation of the Written Opinion of the International Searching Authority for International Application No. PCT/JP2022/029413, dated Feb. 6, 2024.
Chinese Office Action and Search Report for Chinese Application No. 202280043052.X, dated Apr. 1, 2026, with English translation.

* cited by examiner $F_{R-ref}$, $F_{L-ref}$ : Axle demanded driving force $V_{R-sta}$ : Reference vehicle body velocity of right wheel $V_{L-sta}$ : Reference vehicle body velocity of left wheel $T_{R-ref}$, $T_{L-ref}$ : Axle demanded torque $\dot{\omega}_R$ , $\dot{\omega}_L$     : Wheel rotation angular acceleration $J_{Rt}$ , $J_{Lt}$     : Axle downstream inertia $r$          : Tire effective radius

FIG.6

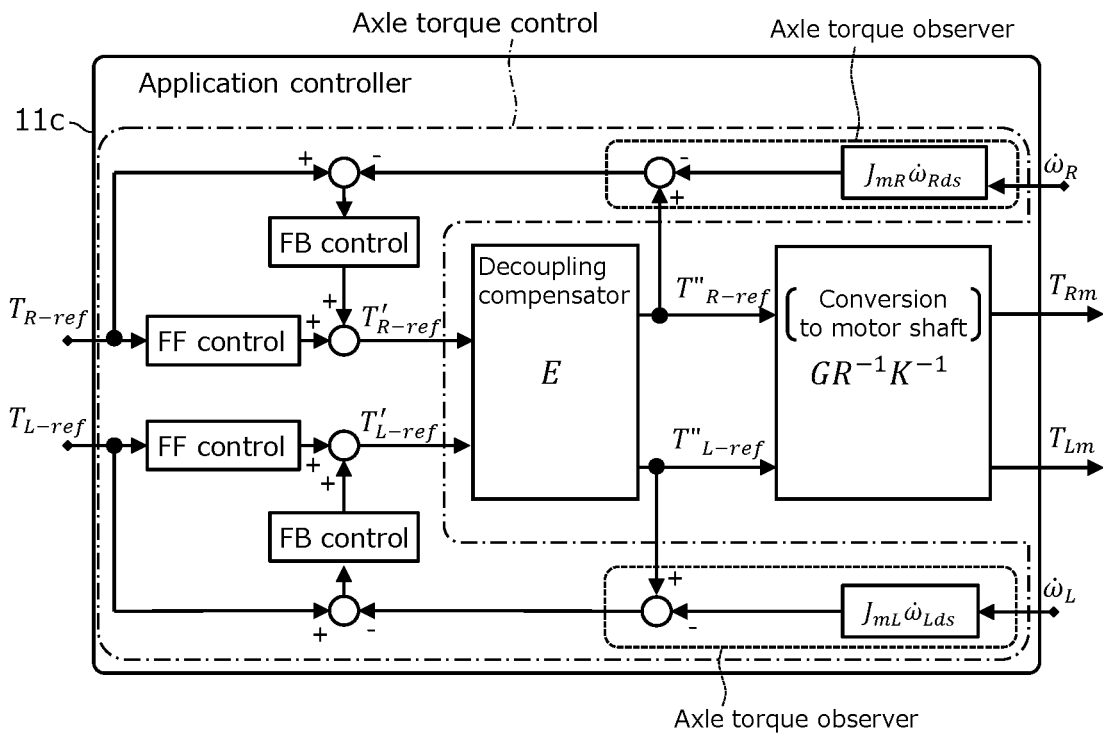

$T_{R-ref}$ , $T_{L-ref}$ : Axle demanded torque $T'_{R-ref}$ , $T'_{L-ref}$ : Axle control torque $T''_{R-ref}$ , $T''_{L-ref}$ : Second axle control torque $T_{Rm}$ , $T_{Lm}$ : Motor control torque $\dot{\omega}_R$ , $\dot{\omega}_L$ : Wheel rotation angular acceleration $\dot{\omega}_{Rds}$ , $\dot{\omega}_{Lds}$ : Axle upstream rotation angular acceleration $J_{Rm}$ , $J_{Lm}$ : Axle upstream motor equivalent inertia

FIG 10

| | | RESULT OF DETERMINATION OF FIRST MOTOR CONTROLLER 13 | | |
| --- | --- | --- | --- | --- |
| | | MATCH | NOT MATCH | DELAY FOR X CYCLES |
| RESULT OF DETERMINATION OF SECOND MOTOR CONTROLLER 14 | MATCH | RIGHT ASSIGNED TORQUE : NOT CORRECTING LEFT ASSIGNED TORQUE : NOT CORRECTING | SET SECOND MOTOR CONTROLLER 14 TO MAIN | SET SECOND MOTOR CONTROLLER 14 TO MAIN |
| | NOT MATCH | SET FIRST MOTOR CONTROLLER 13 TO MAIN | SET FIRST MOTOR CONTROLLER 13 TO MAIN | RIGHT ASSIGNED TORQUE : X-CYCLE BEFORE LEFT ASSIGNED TORQUE : NOT CORRECTING |
| | DELAY FOR Y CYCLES | SET FIRST MOTOR CONTROLLER 13 TO MAIN | RIGHT ASSIGNED TORQUE : NOT CORRECTING LEFT ASSIGNED TORQUE : Y-CYCLE BEFORE | SET ONE OF MOTOR CONTROLLER HAVING A LESS DELAY CYCLES X OR Y TO MAIN |

CONTROL SYSTEM FOR VEHICLE

TECHNICAL FIELD

The present invention relates to a control system for a vehicle provided with a differential mechanism that applies a torque difference to left and right wheels and two electric motors connected to the differential mechanism.

BACKGROUND

Conventionally, a differential mechanism (power distribution mechanisms) has been known which, in an electric vehicle having two independent electric motors, mechanically connects each of the electric motors to left and right wheels and amplifies, when the output torques from the left and right electric motors have a difference, the difference and applies the amplified difference to the left and right wheels. For example, Patent Document 1 discloses, as a differential mechanism, an energy transmission device formed of a planetary gear device or a rotor. Including a differential mechanism having an amplifying function brings an advantage that a large torque difference can be generated on the left and right wheels.

PRIOR ART DOCUMENT

Patent Document

[Patent Document 1] Japanese Patent No. 4637136

SUMMARY OF INVENTION

Problems to be Solved by Invention

Incidentally, since a differential mechanism is a mechanism that mechanically connects two electric motors to left and right wheels, the rotations (torques) may interfere with each other. This interference may cause the vehicle to vibrate. In addition, the interference may make it impossible to apply a demanded torque difference to the left and right wheels. However, in a configuration of the above Patent Document 1 in which all sensor signals are input into a single ECU (electronic control unit) and the ECU controls two PDUs (power drive units), it is difficult to compensate for the interference because this configuration has difficulty in perform precise control. It should be noted that such a problem may also occur in a configuration in which a differential mechanism does not have an amplifying function.

With the foregoing problems in view, one of the objects of the present disclosure is to compensate for rotational interference peculiar to a mechanism in a vehicle provided with two electric motors and a differential mechanism. In addition to the above object, influences and effects which are derived from each configuration of an embodiment to carry out the invention to be described below and which is not obtained by the conventional technique can be regarded as other objects of the present disclosure.

Means to Solve Problem

The present disclosure can be achieved by means of an embodiment and an application. The disclosed control system for a vehicle solves at least part of the above problem.

The vehicle control system disclosed herein is a control system for a vehicle provided with a differential mechanism that applies a torque difference to left and right wheels and two electric motors coupled to the differential mechanism.

The control system includes: two control units being connected to each other via high-speed communication means and each controlling one of the two electric motors; a first rotation speed sensor that detects a first rotation speed of a first electric motor of the two electric motors and outputs the first rotation speed to the two control units; a second rotation speed sensor that detects a second rotation speed of a second electric motor of the two electric motors and outputs the second rotation speed to the two control units; and a superordinate control unit that calculates a demanded torques of the two electric motors based on vehicle information of the vehicle.

At least a first control unit of the two control units calculates two assigned torques to achieve the demanded torques calculated in the superordinate control unit based on a detection signal of the first rotation speed sensor and a detection signal of the second rotation speed sensor.

Effect Of Invention

The vehicle control system of the present disclosure can perform a precise arithmetic operation that can compensate for rotational interference peculiar to a mechanism, and consequently demanded torques can be achieved more accurately.

BRIEF DESCRIPTION OF DRAWINGS

FIG. 6 is a block diagram illustrating an example of axle torque control of FIG. 3;

FIG. 10 is a table illustrating an example of synchronous control of FIG. 9.

EMBODIMENT TO CARRY OUT INVENTION

Description will now be made in relation to a vehicle control system according to embodiments with reference to accompanying drawings. The following embodiments are merely illustrative and there is no intention to exclude various modifications and applications of technique not explicitly described. The configurations of the embodiments can be variously modified without departing the scope of the invention. In addition, the configurations may be selected and omitted according to the requirement and may be appropriately combined.

The following description illustrates control systems according to two embodiments. These control systems are different only in the configuration of motor controllers (control units) to be described below, and the same in the remaining configurations (a vehicle configuration and a superordinate control unit). The configuration common to the two embodiments will be described in detail in a first embodiment. The embodiments to be described below assume that motors (electric motors), axles, wheels, inverters, wheel velocity sensors, and rotation speed sensors are paired on the left and right sides.

1. First Embodiment

1-1. Vehicle Configuration

Figure 1:
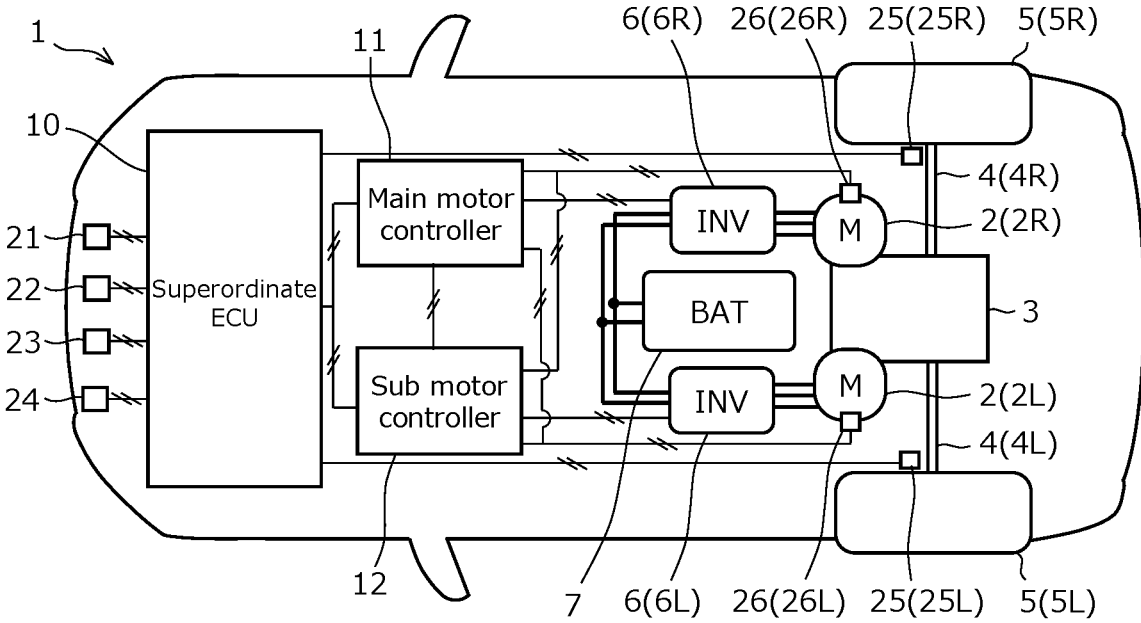
FIG. 1 is a schematic diagram showing a vehicle adopting a control system according to a first embodiment.

FIG. 1 is a schematic diagram of a vehicle 1 including a control system of the present embodiment. On the vehicle 1, two motors 2 (electric motors) that drive left and right wheels 5 (here rear wheels) are mounted. In following description, the letters "L" or "R" attached to the end of a reference sign indicate the location (on the left or right side of the vehicle 1) of the element represented by the reference sign. For example, 5L represents one (i.e., left wheel) of the left and right wheels 5 located on the left side (Left) of vehicle, and 5R represents the other (i.e., the right wheel) located on the right side (Right).

The two motors 2 have a function of driving at least either front wheels or rear wheels of the vehicle 1, and may have a function of driving all four wheels. Hereinafter, one arranged on the left side of the two motors 2 is also called a left motor 2L, and the other arranged on the right side is also called a right motor 2R. The left motor 2L and the right motor 2R operate independently of each other, and may individually output driving forces of respective different magnitudes. The left motor 2L and the right motor 2R of the present embodiment have the same rated output and are provided "in pair".

Figure 2:
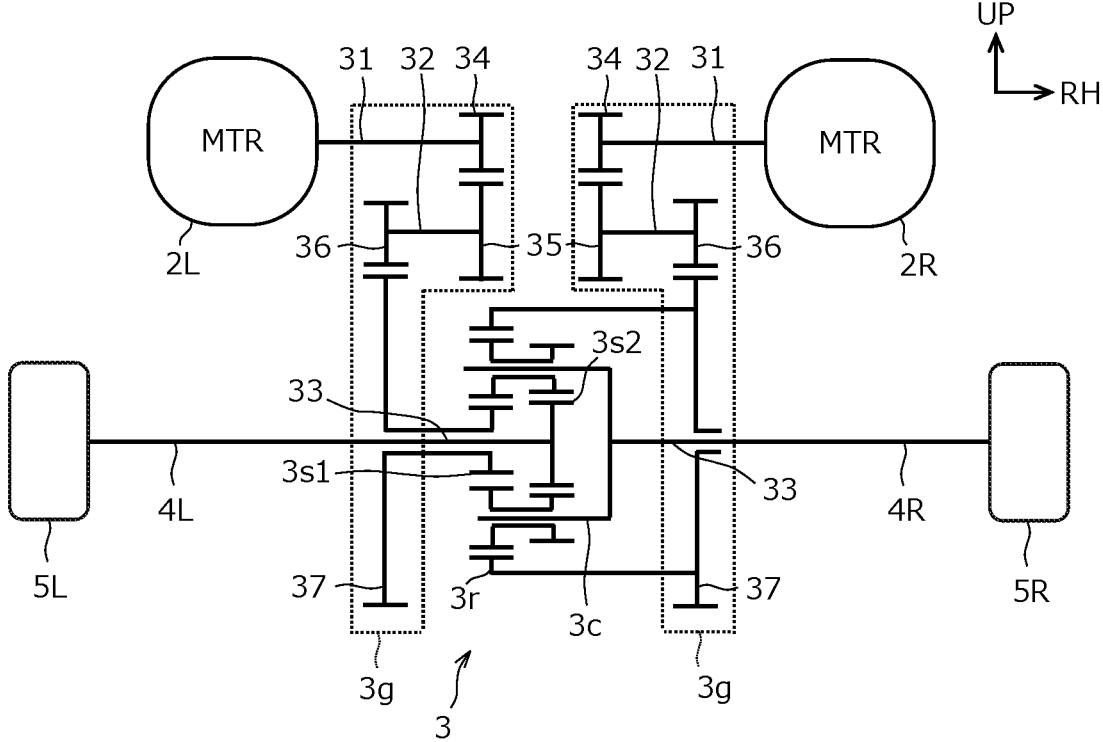
FIG. 2 is a skeleton diagram illustrating an example of the configuration of a differential mechanism mounted on a vehicle according to each embodiment.

The vehicle 1 includes a power distribution mechanism 3 (differential mechanism) that applies a torque difference to the left and right wheels 5. The power distribution mechanism 3 of the present embodiment has a function of amplifying the torque difference between the two motors 2 and then distributing the torque to the left and right wheels 5. As shown in FIG. 2, the power distribution mechanism 3 includes a pair of reduction mechanisms 3g (gear trains surrounded by broken lines in FIG. 2) that reduce the rotation velocities of the respective motors 2. The reduction mechanisms 3g are each mechanism that increases torque by decelerating torque (driving force) outputted from the motor 2. The reduction ratio G of each reduction mechanism 3g is appropriately set according to the output characteristic and the performance of the motor 2. In the present embodiment, the reduction ratios G of the left and right reduction mechanisms 3g are the same. If the torque performances of the motors 2 are sufficiently high, the reduction mechanisms 3g may be omitted. The pair of motors 2 are connected to the power distribution mechanism 3, and the torques are amplified by reducing the rotation speed of the motors 2 and the amplified torques are transmitted (distributed) to the left and right wheels 5.

As shown in FIGS. 1 and 2, the power distribution mechanism 3 is a differential mechanism having a yaw control function (AYC function), and is interposed between an axle 4 (left axle 4L) connected to the left wheel 5L and an axle 4 (right axle 4R) connected to the right wheel 5R. The yaw control function is a function that adjusts the yaw moment by actively controlling the sharing ratio of the driving forces (driving torques) of the left and right wheels and stabilizes the posture of the vehicle 1. A planetary gear mechanism, a differential gear mechanism, and the like are incorporated in the power distribution mechanism 3. The vehicle driving apparatus including the pair of the motors 2 and the power distribution mechanism 3 is also referred to as a Dual-Motor Active Yaw Control (DM AYC) apparatus.

Here, description will now be made in relation to an example of the power distribution mechanism 3 with reference to FIG. 2. The power distribution mechanism 3 shown in FIG. 2 includes a pair of reduction mechanisms 3g set at a reduction ratio G and a planetary gear mechanism having a function of amplifying a torque difference at a predetermined amplification ratio. The power distribution mechanism 3 is preferably arranged between the left and right motors 2L and 2R in the vehicle width direction.

The planetary gear mechanism is a double pinion planetary gear in which a sun gear $3s1$ and a ring gear $3r$ are the input element and a sun gear $3s2$ and a carrier $3c$ are the output elements. Torque from left motor 2L is input to the sun gear $3s1$, and torque from right motor 2R is input to the ring gear $3r$. The input elements are provided so as to rotate integrally with an idler gear 37, which will be described below, and the output elements are provided so as to rotate integrally with the output shaft 33.

Each reduction mechanism 3g is configured to decelerate the rotation speed of the corresponding motor 2 in two stages by means of four gears 34, 35, 36, and 37 provided on three shafts 31, 32, and 33 arranged in parallel to each other. Hereinafter, the three shafts are referred to as a motor shaft 31, a counter shaft 32, and an output shaft 33 in order from the upstream side of the power transmission path from the motors 2 to the left and the right wheels 5. These shafts 31 to 33 are provided in the power distribution mechanism 3 in pairs. The two motor shafts 31, the two counter shafts 32, the two output shafts 33 positioned on the left and the right are configured similarly (symmetrically). Further, the reduction gears 3g provided to these shafts 31 to 33 are also configured similarly on the left and the right (symmetrically).

The motor shafts 31 are positioned coaxially with the respective rotational shafts of the left and right motors 2, and each have a first fixed gear 34. Each counter shaft 32 is provided with a second fixed gear 35 meshing with the first fixed gear 34 and a third fixed gear 36 having a smaller diameter than the second fixed gear 35. The second fixed gear 35 having a larger diameter is arranged inside in the vehicle width direction than the third fixed gear 36 having a smaller diameter. The output shaft 33 is provided with the idle gear 37 meshing with the third fixed gear 36. The first fixed gear 34 and the second fixed gear 35 constitute a first-stage reduction gear train, and the third fixed gear 36 and the idle gear 37 constitute a second-stage reduction gear train. The sun gear $3s1$ is connected to the left idle gear 37, and the ring gear $3r$ is connected to the right idle gear 37.

As shown in FIG. 1, the motors 2L and 2R are electrically connected to the battery 7 via inverters 6 (6L and 6R). The inverters 6 are converters (DC-AC inverters) that mutually convert the power (DC power) of a DC circuit on the battery 7 side and the power (AC power) of the AC circuit on the motor 2 side. The battery 7 is, for example, a lithium-ion secondary battery or a nickel-metal hydride secondary battery, and is a secondary battery capable of supplying a high-voltage DC current of several hundred volts. While the electric motors 2 are power running, the DC power is converted into AC power by the inverters 6 and the converted AC power is then supplied to the electric motors 2. At the time of power generation of motor 2, the generated electric power is converted into DC electric power by inverter 6 and is charged into battery 7.

As electronic control units (ECU, Electronic Control Units) related to the control of the motors 2, the vehicle 1 is provided with one superordinate ECU 10 (superordinate control unit) and two motor controllers 11 and 12 (control units). These electronic control units 10-12 are communicably connected to one another via an on-board communication network. In addition to these electronic control units 10-12, other electronic control units (e.g., battery control unit, brake control unit, etc.) mounted on the vehicle 1 and various electronics devices are connected to the on-board communication network.

The electronic control units 10-12 are implemented with, for example, a processor (microprocessor) such as a CPU (Central Processing Unit) and an MPU (Micro Processing Unit), and a ROM (Read Only Memory), a RAM (Random Access Memory), and a non-volatile memory. A processor is an arithmetic processing device that incorporates therein a control unit (controlling circuit), an arithmetic unit (arithmetic circuit), and a cache memory (register group), for example. The ROM, the RAM and the non-volatile memory are memory devices in which program and data in operation are stored. The control content of the respective electronic control units 10-12 is recorded, in the form of an application program for example, into the respective ROMs, RAMS, non-volatile memories and removable media. When a program is to be executed, the contents of the program is expanded in a memory space in the RAM and executed by the processor.

The superordinate ECU 10 is an electronic control unit that comprehensively controls the overall electronic devices mounted on the vehicle 1, and is exemplified by an EV-ECU (Electric Vehicle-ECU), a HEV-ECU (Hybrid Electric Vehicle-ECU), a PHEV-ECU (Plug-in Hybrid Electric Vehicle-ECU), and the like. To the superordinate ECU 10, sensors for obtaining various kinds of information of the vehicle 1 (hereinafter, referred to as "vehicle information") are connected. In the example shown in FIG. 1, an acceleration opening sensor 21, a brake sensor 22, a steering angle sensor 23, a vehicle velocity sensor 24, and a wheel velocity sensor 25 are connected to the superordinate ECU 10.

The acceleration opening sensor 21 is a sensor that detects the amount (accelerator opening degree) of depressing of the accelerator pedal and the depression velocity. The brake sensor 22 is a sensor that detects the amount (brake pedal stroke) of depressing of the brake pedal and the depression velocity. The steering angle sensor 23 is a sensor that detects the steering angle (actual steering angle or steering angle of the steering) of the left and right wheels 5, and the vehicle velocity sensor 24 is a sensor that detects vehicle velocity (vehicle body velocity). The wheel velocity sensors 25L and 25R are sensors that detect wheel angular speed $\omega_L$, of the left wheel 5L and the wheel angular speed $\omega_R$ of the right wheel 5R, respectively, and are disposed in the vicinity of the left wheel 5L and the right wheel 5R, respectively.

The motor controllers 11 and 12 are electronic control units that control the operation statuses of the motors 2L and 2R by controlling the inverters 6L and 6R. The two motor controllers 11 and 12 are connected to each other by high-speed communication means such as a local CAN or a hard wire, and can transmit and receive information to and from each other. Further, the motor controllers 11 and 12 are connected to the superordinate ECU 10 so as to be capable of CAN communication, for example. The motor controllers 11 and 12 are connected to rotation speed sensors 26L and 26R that detect the rotation speeds of the motors 2L and 2R, respectively. Examples of the rotation speed sensors 26L and 26R include a resolver, a hall sensor, and an encoder, but a sensor with high-detection accuracy is preferably used.

The left rotation speed sensor 26L is provided to the left motor 2L and detects the rotation speed of the left motor 2L (left motor rotation angular speed $\omega_{Lm}$) and outputs the detected rotation speed to the two motor controllers 11 and 12. Likewise, the right rotation speed sensor 26R is provided to the right motor 2R and detects the rotation speed of the right motor 2R (right motor rotation angular speed $\omega_{Rm}$) and outputs the detected rotation speed to the two motor controllers 11 and 12. In the following explanation, when the left and right rotation speed sensors 26L and 26R are not particularly distinguished from each other, the rotation speed sensors 26L and 26R are referred to as "rotation speed sensors 26".

1-2. Control Configuration

The superordinate ECU 10 calculates demanded torques of the respective motors 2L and 2R based on the vehicle information (accelerator opening degree, brake pedal stroke, steering angle, vehicle body velocity, and wheel velocity) detected by the sensors 21-25. The demanded torques calculated here are torques (target values of torques) to be achieved in the vehicle 1 by the driver's operation and the traveling condition of the vehicle 1. For example, the superordinate ECU 10 may calculate the total drive torque based on the driver's operation and the traveling condition, obtain a target value of the torque difference to be applied to the left and right wheels 5, and calculate the demanded torque of the left motor 2L and the demanded torque of the right motor 2R from the total drive torque and the target torque difference. The calculation method of the demanded torque is not particularly limited.

At least one of the two motor controllers 11 and 12 calculates two assigned torques to achieve the demanded torques calculated in the superordinate ECU 10 on the basis of a detection signal by the left rotation speed sensor 26L and a detection signal by the right rotation speed sensor 26R. Of the two assigned torques calculated here, one is an assigned torque for controlling one motor 2, and the other is an assigned torque for controlling the other motor 2. Hereinafter, detection signals of the rotation speed sensors 26L and 26R are simply referred to as "detection signals".

As shown in FIG. 1, in the control system of the present embodiment, the motor controller 11, which controls the right motor 2R, calculates two assigned torques on the basis of the two detection signals. hereinafter, the motor controller 11 is also referred to as a "main motor controller 11". The main motor controller 11 (main control unit) calculates two assigned torques, and controls the right motor 2R (first motor) by using one assigned torque (hereinafter referred to as "main-side assigned torque"). Hereinafter, a motor 2 (here, the right motor 2R) controlled by the main motor controller 11 is also referred to as a "main-side motor 2".

Further, the main motor controller 11 transmits the calculated other assigned torque to the motor controller 12, which controls the left motor 2L, via the high-speed communication means. Hereinafter, the other motor controller 12 is also referred to as a "sub motor controller 12". The sub motor controller 12 controls the left motor 2L (the second motor) by using an assigned torque (hereinafter referred to as "sub-side assigned torque") transmitted from the main motor controller 11. Hereinafter, a motor 2 (here, the left motor 2L) controlled by the sub motor controller 12 is also referred to as a "sub-side motor 2". The left and right sides of the main-side and sub-side motors 2 may be reversed.

That is, in the control system of the present embodiment, the main motor controller 11 solely calculates, as well as the assigned torque of the main-side motor 2 which is the control target of the main motor controller 11 itself, the assigned torque of the sub-side motor 2 on the basis of the two detection signals. The sub-side assigned torque calculated by the main motor controller 11 is transmitted to the sub-motor controller 12 by means of the high-speed communication (for example, high-speed CAN communication). The sub motor controller 12 simply uses the sub-side assigned torque received from the main motor controller 11. This system eliminates the need for synchronous control between the two motor controllers 11 and 12. The communication speed between the two motor controllers 11 and 12 is higher than the communication speed between the superordinate ECU 10 and the respective motor controllers 11 and 12, and is, for example, about 10 times. This makes it possible to more precisely control the motors 2.

In the control system of the present embodiment, the main-side assigned torque calculated by the main motor controller 11 is also transmitted to the sub-motor controller 12 via the high-speed communication means. Like the main motor controller 11, the sub motor controller 12 calculates two assigned torques based on two detection signals. Then, the sub-motor controller 12 performs fail monitoring by comparing one of the calculated assigned torques (i.e., on the main side) with the main-side assigned torque received from the main motor controller 11. Furthermore, the sub-motor controller 12 performs fail monitoring by comparing the other one (i.e., on the sub side) of the calculated assigned torques with the sub-side assigned torque received from the main motor controller 11.

The sub motor controller 12 performs the same calculation as that performed in the main-motor controller 11 in the background and compares the values of two assigned torques received from the main motor controller 11 with the value of the two assigned torques calculated therein, so that the inconveniences such as a failure of the motor controllers 11 and 12, a failure in the high-speed communication means, and a disconnection of hard wire are monitored. In the control system of the present embodiment, the fail monitoring is performed only by the sub motor controller 12. This means that the roles of the two motor controllers 11 and 12 are clearly divided.

Figure 3:
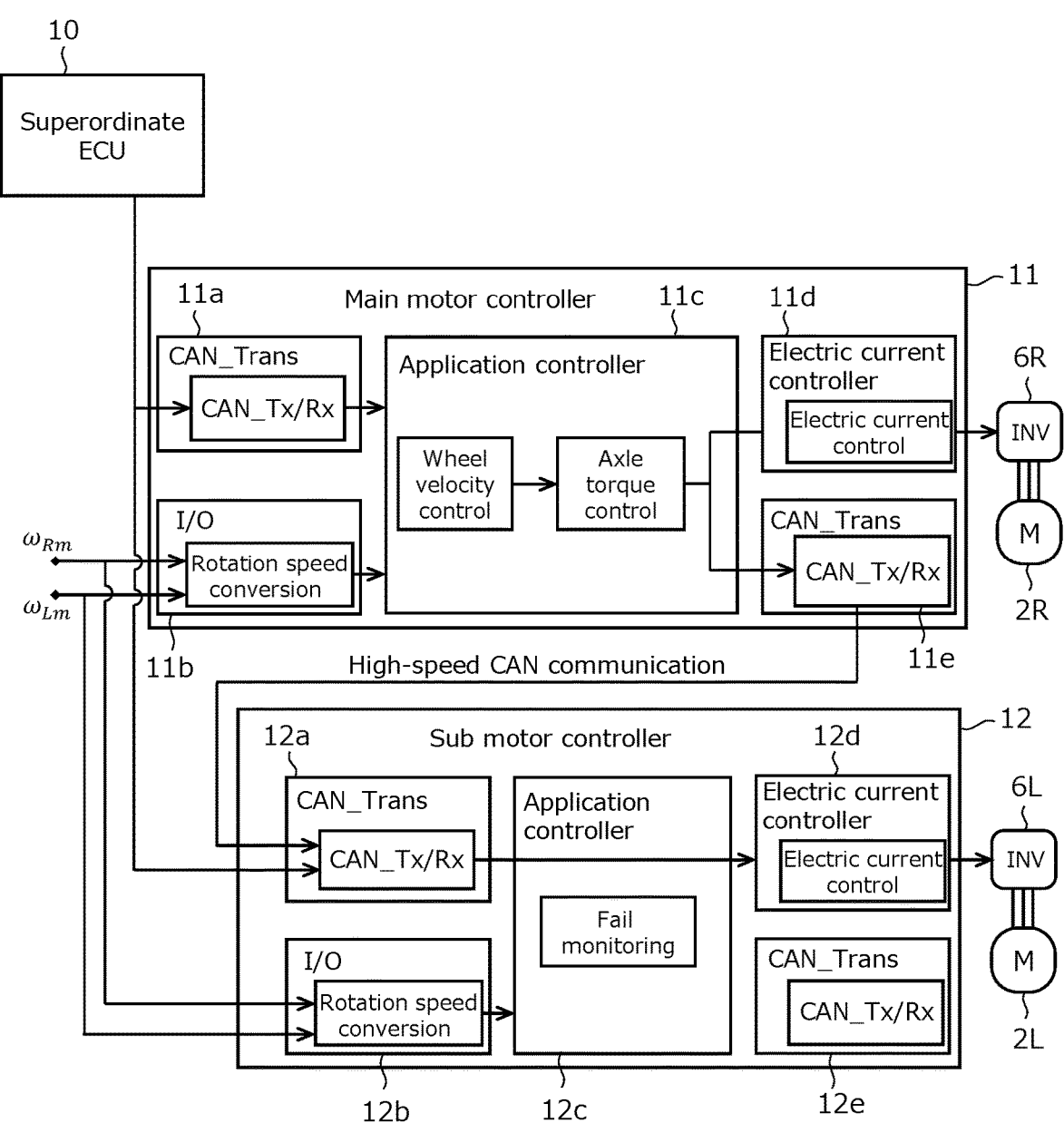
FIG. 3 is a block diagram showing an example of the configuration of the control system of FIG. 1.
Figure 4:
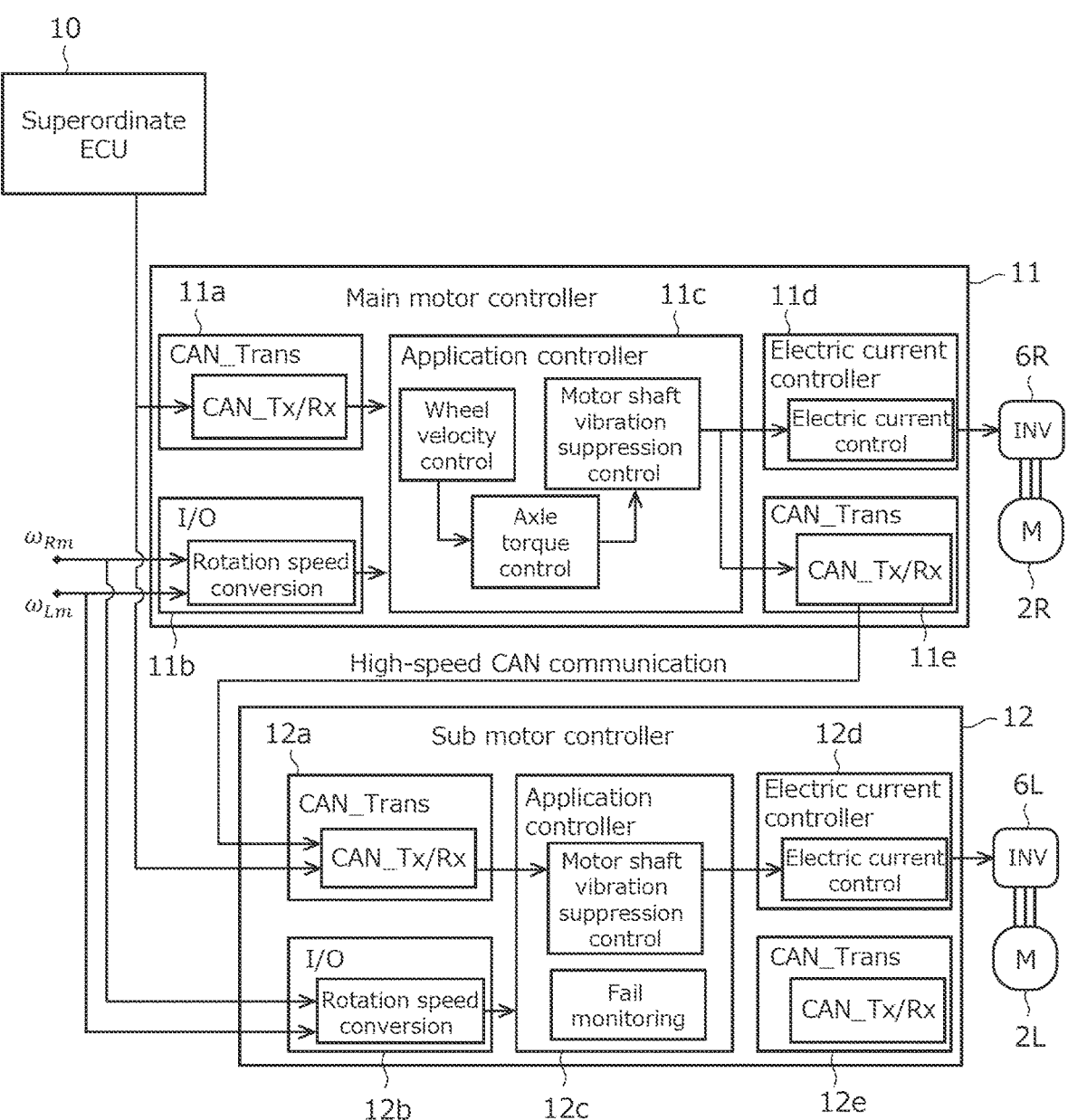
FIG. 4 is a block diagram showing a modification to FIG. 3.

FIG. 3 and FIG. 4 are diagrams illustrating an example of the configuration of the control system according to the embodiments. The illustration of the rotation speed sensors 26 is omitted, and in turn, the inputs of detection signals (motor rotation angular speeds $\omega_{Lm}$ and $\omega_{Rm}$) are illustrated. The main motor controller 11 and the sub motor controller 12 include first CAN transceivers 11a and 12a, I/O (Input/Output) units 11b and 12b, application controllers 11c and 12c, electric current controllers 11d and 12d, and second CAN transceivers 11e and 12e, respectively. FIG. 3 and FIG. 4 are different from each other only in a point as to whether the application controllers 11c and 12c perform motor shaft vibration suppression control to be described below.

The CAN transceivers 11a, 11e, 12a and 12e and the I/O units 11b and 12b all have hardware configurations. The first CAN transceivers 11a and 12a receive the demanded torques from the superordinate ECU 10. The first CAN transceiver 12a of the sub motor controller 12 also receives the sub-side assigned torque transmitted from the second CAN transceiver 11e of the main motor controller 11. The I/O units 11b and 12b receive the motor rotation angular speeds $\omega_{Lm}$ and $\omega_{Rm}$ from the two rotation speed sensors 26L and 26R, and obtain estimated wheel velocities of left and right wheel velocities (values corresponding to the above wheel angular speeds $\omega_L$ and $\omega_R$) by performing rotation speed conversion. The estimated wheel velocities can be used for control in place of the wheel angular speeds $\omega_L$ and $\omega_R$ detected by the wheel velocity sensors 25L and 25R.

On the other hand, the application controllers 11c and 12c and the electric current controllers 11d and 12d all have software configurations, and represent functions of the motor controllers 11 and 12 being classified for convenience. These elements may each be described as an independent program and may also be described as a combined program of multiple elements. A program corresponding to each element is stored in memories or storing devices of the motor controllers 11 and 12, and is executed by a processor.

The application controller 11c of the main motor controller 11 shown in FIG. 3 calculates the respective assigned torques of the motors 2L and 2R by executing two types of control, i.e., wheel velocity control and axle torque control. In FIG. 3, the axle torque control is performed after the wheel velocity control is performed, but the order may be reversed. In the application controller 12c of the sub motor controller 12 shown in FIG. 3, fail monitoring is performed. Hereinafter, an example of the wheel velocity control and the axle torque control will now be described with reference to FIG. 5 and FIG. 6.

Figure 5:
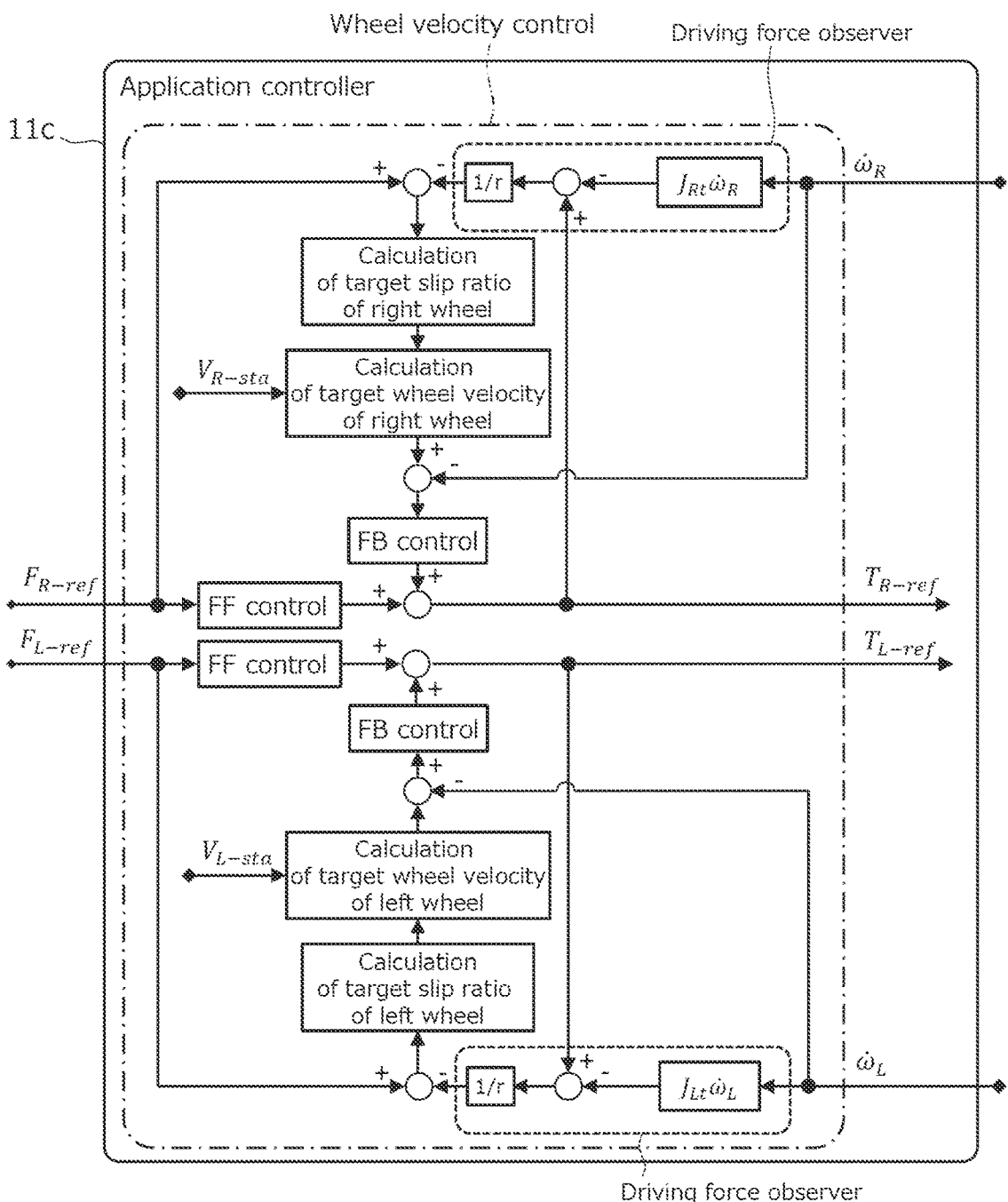
FIG. 5 is a block diagram illustrating an example of wheel velocity control of FIG. 3.

The wheel velocity control is a control that calculates left and right target wheel velocities of the vehicle 1 based on the demanded torques calculated by the superordinate ECU 10 and calculates the torques (axle demanded torques) for achieving the target wheel velocities, using the two detection signals. As illustrated in FIG. 5, in the wheel velocity control, the left and right axle demanded driving forces are used as input values. The axle demanded driving forces correspond to the demanded torques calculated by the superordinate ECU 10, and may be converted in application controller 11c before or during the execution of the wheel velocity control.

In the wheel velocity control, the calculation is performed independently of each other on the left and right sides. In addition, the wheel velocity control includes one feedforward control (FF control), one feedback control (FB control), a calculation process of target slip ratios, and a calculation process of the target wheel velocities. Here, the target slip ratios are target values of respective slip ratios of the left and right wheels 5. The target wheel velocities are determined from the target slip ratios and reference vehicle body velocities. The reference vehicle body velocity can be calculated from, for example, the wheel velocities of the four wheels, but the calculation method is not particularly limited.

In the FF control, the axle demanded driving forces are converted into the axle demanded torques. In the FB control, the target slip ratios are calculated on the basis of the error between the estimated driving force calculated by the driving force observer and the corresponding axle demanded driving force, and then the target wheel velocities are calculated. Based on the error between the target wheel velocity and wheel rotation angular acceleration, a FB amount to be added to the axle demanded torque converted in the FF control is calculated. The driving force observer is an estimator that calculates the estimated driving force by calculating the inertia torque by multiplying the wheel rotation angular acceleration by an axle downstream inertia including the wheel 5; subtracting the inertia torque from the axle demanded torque; and multiplying the difference by the inverse of the effective radius of the wheel 5.

The axle torque control is a control that achieves axial torque corresponding to the demanded torques calculated by the superordinate ECU 10, and includes feedback control using the two detection signals. As shown in FIG. 6, the axle torque control includes one feed-forward control (FF control), one feedback control (FB control), and an axle torque observer that are provided on each of the left and right sides. The axial torque observer is an estimator that calculates estimated axle torque by calculating an inertia torque by multiplying the axle upstream rotation angular acceleration obtained from the wheel rotation angular acceleration by the axle upstream motor equivalent inertia; subtracting the inertia torque from a second axle control torque outputted from the decoupling compensator E to be described below.

In the FF control, the respective axle demanded torques are converted into values considering the decoupling compensator E. In the present embodiment, since the wheel velocity control is performed before the axle torque control, the output value of the wheel velocity control is the input value of the axle torque control, but when the order of these controls is reversed, it is sufficient that the output value and the input value are replaced with each other. In the FB control, the FB amount to be added to the axle control torque after the FF control is calculated on the basis of the error between the axle demanded torque and the estimated axle torque.

Here, the decoupling compensator E will now be briefly described. Since the power distribution mechanism 3 mounted on the vehicle 1 of the present embodiment is a two-input two-output mechanism that mechanically connects the left and right motors 2 with the left and right wheels 5, interference of inertia torques of the left and right motors 2, interference due to friction of the left and right motors 2, interference due to friction between the shaft and the bearing, interference due to friction between the shaft and the gear, and the like (hereinafter, these are referred to as "left-right interference") can occur. The left-right interference becomes an interference torque that affects the axle control torque on the respective opposite sides in relation to the left and right sides. The decoupling compensator E is a compensator that cancels the interference torques affecting on the respective opposite side in relation to the left and right sides. The axle control torques (referred to as "second axle control torques") in which interference torque is cancelled by the decoupling compensator E are converted into motor control torques (assigned torques) to control the respective motors 2L and 2R.

In addition to the wheel velocity control and the axle torque control described above, the motor shaft vibration suppression control is performed in the application controllers 11c and 12c of the motor controllers 11 and 12 illustrated in FIG. 4. In the motor shaft vibration suppression control, a control for suppressing cogging torques is carried out on the basis of the motor control torques (assigned torques) and the motor rotation angular speeds $\omega_{Lm}$, $\omega_{Rm}$ of the respective motors 2L and 2R. Since the motor shaft vibration suppression control is performed in the respective motor controllers 11 and 12 that control the motors 2L and 2R, influence caused by a delay in communication from the main motor controller 11 to the sub motor controller 12 can be eliminated.

The above wheel velocity control, the axle torque control, and the motor shaft vibration suppression control described above are not essential, and all of them may be omitted, only one of them may be performed, or any two of them may be performed in combination. For example, assuming that the wheel velocity control and the axle torque control are omitted, motor control torques (assigned torques) may be calculated by performing the FF control on the demanded torques calculated by the superordinate ECU 10. Likewise, the decoupling compensator E is not essential and may be omitted.

1-3. Flow Diagrams

Next, with reference to FIG. 7, FIG. 8(a), and FIG. 8(b), description will now be made in relation to examples of flow diagram executed by the superordinate ECU 10, the main motor controller 11, and the sub-motor controller 12, respectively. The respective flow charts are repeatedly executed at a predetermined calculation cycle under a predetermined condition, for example, during a period from when the vehicle 1 comes into the Ready ON state until the vehicle 1 comes into the Ready OFF state or while the vehicle is running (when vehicle velocity is not 0). Note that the calculation cycle of the superordinate ECU 10 and the calculation cycles of the motor controllers 11 and 12 may be the same or different from one another.

Figure 7:
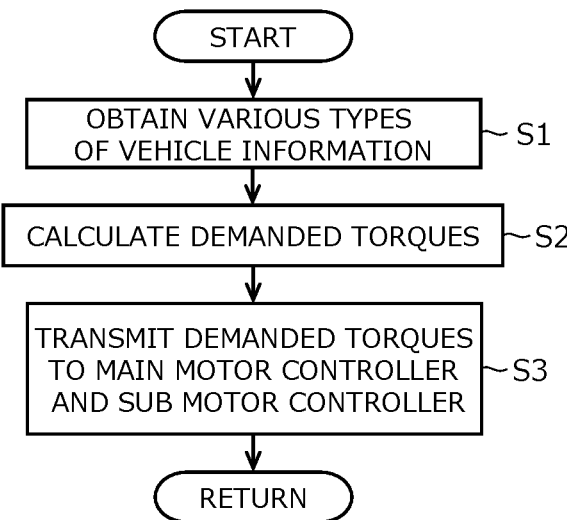
FIG. 7 is an example of a flow diagram executed in a superordinate ECU of FIG. 1.

As shown in FIG. 7, the superordinate ECU 10 first obtains vehicle information detected by the various sensors 21 to 25 (Step S1). Next, the superordinate ECU 10 calculates the respective demanded torques of the motors 2L and 2R (Step S2), transmits the demanded torques to the main motor controller 11 and the sub motor controller 12 (Step S3), and returns this flow diagram.

Figure 8:
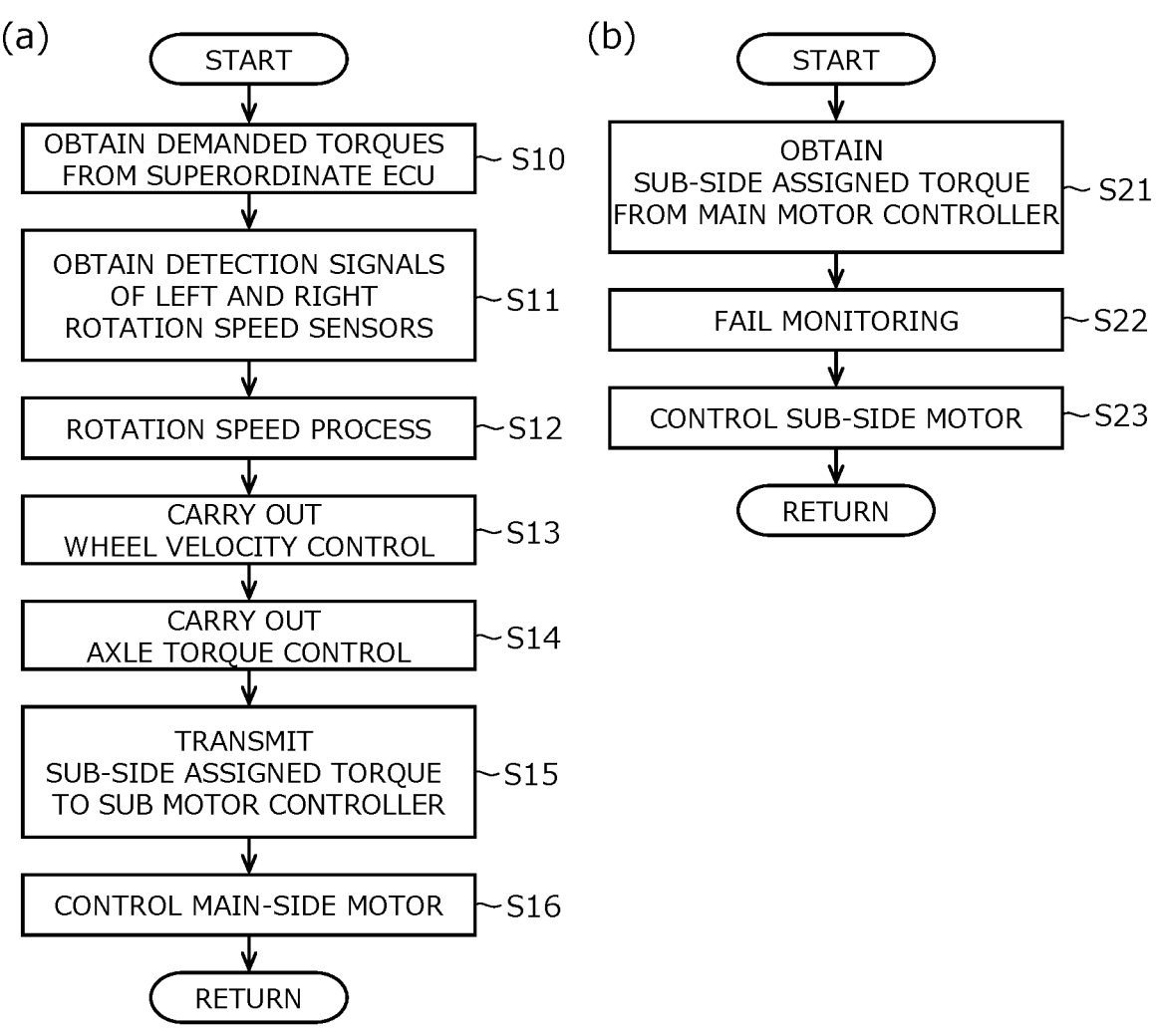
FIG. 8(a) is an example of a flow diagram executed in a main motor controller.
FIG. 8(b) is an example of a flow diagram executed in a sub motor controller.

As shown in FIG. 8(a), the main motor controller 11 obtains the demanded torques from the superordinate ECU 10 (Step S10) and obtains the detection signals of the respective rotation speed sensors 26L and 26R (Step S11). Next, the main motor controller 11 carries out a rotation speed process on the motor rotation angular speeds to $\omega_{Lm}$ and $\omega_{Rm}$ (Step S12), and carries out the wheel velocity control (Step S13). In this example, the main motor controller 11 further carries out the axle torque control (Step S14) to thereby calculate the assigned torques of the respective motors 2L and 2R. Then, the main motor controller 11 transmits the sub-side assigned torque to the sub motor controller 12 (Step S15), controls the main-side motor 2 by using the main-side assigned torque (Step S16), and then returns this flow diagram. Note that Steps S13 and S14 may be performed in the reverse order, or only one of them may be performed.

As illustrated in FIG. 8(b), the sub motor controller 12 obtains the sub-side assigned torque from the main motor controller 11 (Step S21), carries out fail monitoring (Step S22), and controls the sub-side motor 2 using the sub-side assigned torque. In the fail monitoring of Step S22, the sub motor controller 12 calculates the two assigned torques by performing the same process (calculation and control) as that performed in the main motor controller 11, and also obtains the main-side assigned torque from the main motor controller 11. Then, the sub motor controller 12 compares the two main-side assigned torques and also the two sub-side assigned torques, so that the presence of any failure is monitored.

1-4. Action and Effect

In the above-described control system, the detection signals of the two speed sensors 26L and 26R are inputted to each of the two motor controllers 11 and 12, and the assigned torques are calculated by at least one of the two subordinate motor controllers 11 and 12 (here, the main motor controller 11) such that the demanded torques calculated in the superordinate ECU 10 can be achieved. In this calculation, since the values of the two signals are used, it is possible to perform a precise calculation to compensate for the rotational interference peculiar to the mechanism. Therefore, it is possible to more accurately achieve the demanded torques (for example, left and right driving torques as a demand instruction or torque difference between the left and right wheels 5).

In the above-described control system, one of the two motor controllers 11 and 12 is regarded as the main and the other is regarded as the sub. The main motor controller 11 calculates the two assigned torques by grasping the respective rotation speeds $\omega_{Lm}$ and $\omega_{Rm}$ of the two motors 2L and 2R at the same timing and transmits the sub-side assigned torque to the sub motor controller 12 via the high-speed communication. Therefore, it is possible to perform precise calculation to compensate for the rotational interference eliminating the requirement for the synchronous control between the two motor controllers 11 and 12, and consequently demanded torques can be achieved more accurately.

Further, since the above sub motor controller 12 performs the same arithmetic operation as the main motor controller 11 and two fail monitoring are performed in the sub motor controller 12, the sub motor controller 12 can monitor occurrence of a failure, a communication failure, and disconnection of the respective motor controllers 11 and 12.

In the above-described control system, the main motor controller 11 performs the axle torque control that achieves axle torques corresponding to the demanded torques calculated by the superordinate ECU 10. This axle torque control includes the FB control that uses the two detection signals, and can calculate assigned torques of the motors 2L and 2R capable of achieving the demanded torques. Since the present embodiment is provided with the decoupling compensator E on the downstream side of the axle torque control, it is possible to cancel out the left-right interference and consequently the control system treats the vehicle 1 as a vehicle having a mechanism in which the left and right sides are equivalently independent from each other so that it is possible to simplify the control configuration.

In the above-described control system, the main motor controller 11 further performs the wheel velocity control that achieve the target wheel velocities. Specifically, the main motor controller 11 calculates the target wheel velocities based on the demanded torques calculated by the superordinate ECU 10, and calculates assigned torques of the motors 2L and 2R that can achieve the target wheel velocities, using the two detection signals. Therefore, the demanded torques calculated by the superordinate ECU 10 can be achieved from the aspect of the wheel velocities.

2. Second Embodiment

2-1. Configuration

Next, description will now be made in relation to the control system according to the second embodiment. The control system of the present embodiment can also be applied to the vehicle 1 shown in FIG. 1, which is provided with the power distribution mechanism 3 shown in FIG. 2. The control system of the present embodiment is different from the first embodiment in the point that the two motor controllers are not distinguished from each other by a main side or a sub side. In other words, the control system of the present embodiment is a system that excludes the roles of the "main" and the "sub" from the main motor controller 11 and the sub motor controller 12 of FIG. 1.

Figure 9:
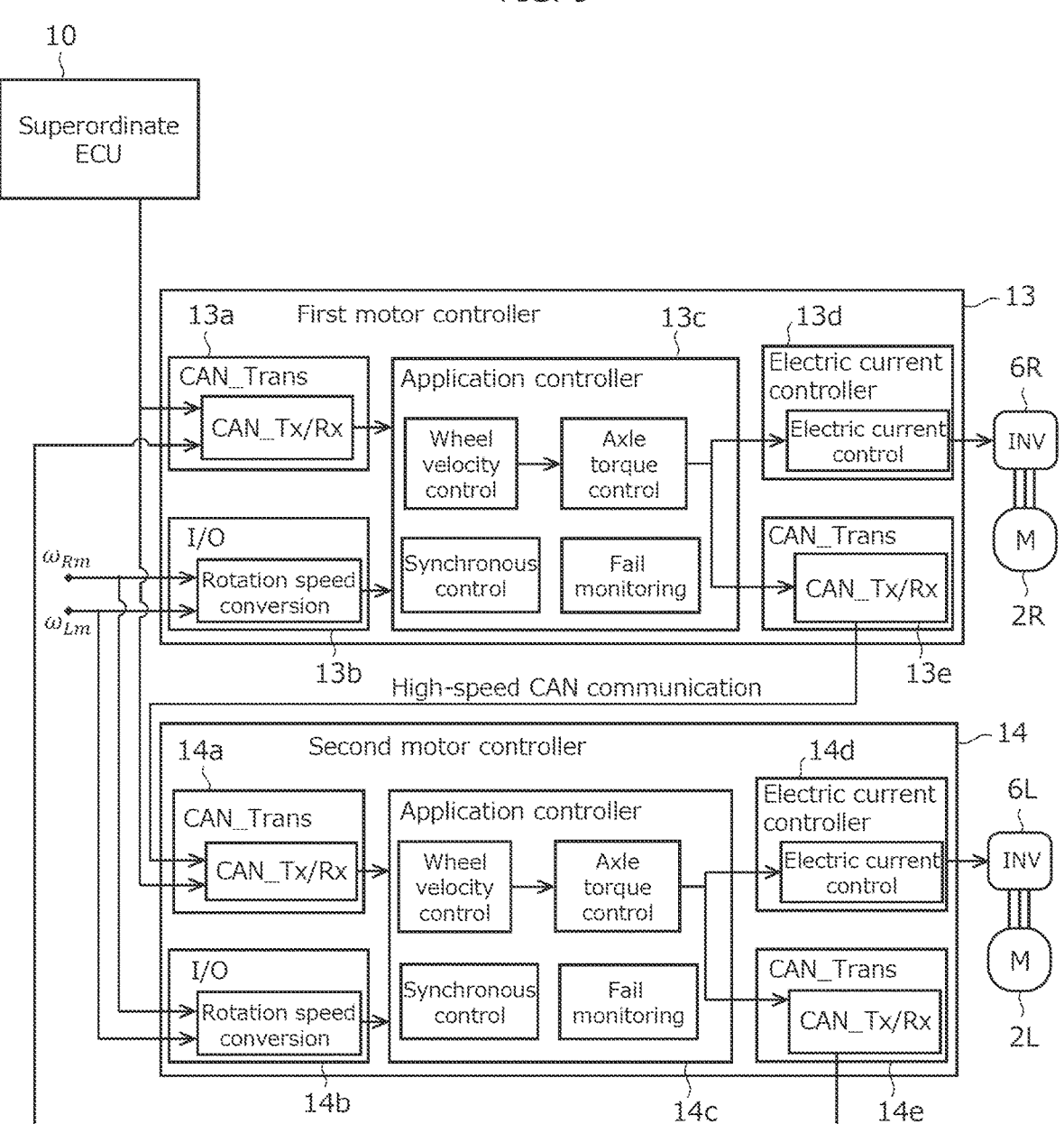
FIG. 9 is a block diagram showing an example of the configuration a control system according to a second embodiment.

FIG. 9 is a block diagram showing an example of the configuration of the control system according to the present embodiment, and corresponds to FIG. 3. A first motor controller 13 and a second motor controller 14 are electronic control units related to the control of motors 2, and are connected to each other via the high-speed communication means. In this example, the first motor controller 13 controls the right motor 2R and the second motor controller 14 controls the left motor 2L, but the left and right motors 2L and 2R may be replaced with each other.

The two motor controllers 13, 14 are configured similarly to each other. Specifically, like the above controller 11, the motor controllers 13 and 14 include first CAN transceivers 13a and 14a, I/O (Input/Output) units 13b and 14b, application controllers 13c and 14c, electric current controllers 13d and 14d, and second CAN transceivers 13e and 14e, respectively. The difference from the first embodiment is that the wheel velocity control, the axle torque control, and the fail monitoring described above are performed in either of the application controllers 13c and 14c.

That is, the first motor controller 13 calculates the assigned torques of the two motors 2 based on the two detection signals, and uses one of the calculated assigned torques to control one motor 2 (here, the right motor 2R). Similarly, the second motor controller 14 calculates the assigned torques of the two motors 2 based on the two detection signals, and uses other one of the calculated assigned torques to control the other motor 2 (here, the left motor 2L). Further, the motor controllers 13 and 14 transmit and receive the two calculated assigned torques to and from each other via the high-speed communication means, and perform fail monitoring.

Further, in the control system of the present embodiment, the motor controllers 13 and 14 each carry out synchronous control by comparing the calculated assigned torques with the respective corresponding assigned torques received via the high-speed communication unit. In this synchronous control, the motor controllers 13 and 14 each determine whether or not the values of the two assigned torques compared with each other match, transmit and receive signal information (for example, flag information) representing the determination result, and control each motor 2 by referring to the signal information.

Each of the motor controllers 13 and 14 calculates two assigned torques in a predetermined calculation cycle, and store at least values of the assigned torque of the motor 2 controlled by itself of predetermined cycles (for example, several to ten cycles from the present calculation cycle). This means that the first motor controller 13 stores values of the calculated assigned torque of the right motor 2R of predetermined cycles, and the second motor controller 14 stores values of the calculated assigned torque of the left motor 2L of predetermined cycles. Note that the values of the assigned torque to be stored are updated each time the assigned torque is calculated.

In the synchronous control, each of the motor controllers 13 and 14 compares the assigned torque of the motor 2 controlled by the motor controller itself. That is, the first motor controller 13 compares the calculated assigned torque of the right motor 2R with the assigned torque of the right motor 2R received from the second motor controller 14. The second motor controller 14 compares the calculated assigned torque of the left motor 2L with the assigned torque of left motor 2L received from the first motor controller 13.

If the compared assigned torques match, each of the motor controllers 13 and 14 transmits signal information (e.g., Flag T) indicating the matching.

In contrast, if the compared assigned torques do not match, each of the motor controllers 13 and 14 determines whether a value matching the assigned torque received from the counterpart motor controller 14 or 13 is present in the past assigned torques stored therein.

If a value matching is present, each of the motor controller 13 and 14 transmits signal information indicating the number of cycles tracing back from the present time. For example, if a value of the received assigned torque matches an assigned torque calculated in one cycle before the present time, the signal information is "Flag F1" because the number of cycles tracing back is one. Likewise, the signal information is "Flag F2" when the number of cycles tracing back is two: and the signal information is "Flag Fn" when the number of cycles tracing back is n.

If a value matching is not present, each of the motor controllers 13 and 14 transmits signal information (e.g., Flag F0) indicating any value does not match.

FIG. 10 is a table explaining an example of synchronous control.

The first motor controller 13 compares the two assigned torques (i.e., the assigned torque calculated by the first motor controller 13 and the assisted torque received from the second motor controller 14) for the right motor 2R. If the assigned torques matching each other, the case corresponds to the left column and the first motor controller 13 transmits a Flag T. If the assigned torques do not match, the first motor controller 13 traces back the results of the previous calculations by the first motor controller 13 itself and, if a value matching is present at the X cycle before, the case corresponds to the right column and the first motor controller 13 transmits a Flag FX. On the other hand, if the matching value is not present in the stored assigned torques, the case corresponds to the middle column and the first motor controller 13 transmits a Flag F0.

Similarly, the second motor controller 14 compares the two assigned torques (i.e., the assigned torque calculated by the second motor controller 14 and the assisted torque received from the first motor controller 13) for the left motor 2L. If the assigned torques matching each other, the case corresponds to the top row and the second motor controller 14 transmits a Flag T. If the assigned torques do not match, the second motor controller 14 traces back the results of the previous calculations by the second motor controller 14 itself and, if a value matching is present at the Y cycles before, the case corresponds to the bottom row and the second motor controller 14 transmits a Flag FY. On the other hand, if the matching value is not present in the stored assigned torques, the case corresponds to the middle row and the second motor controller 14 transmits a Flag F0.

If both of the motor controllers 13 and 14 transmit the Flag T, which means that the both assigned left torques match and the both assigned right torques match (in the upper left field of FIG. 10), the calculation timings are not shifted between the two motor controllers 13 and 14 (i.e. the calculating timings are synchronized) and therefore the calculated assigned torques are used without being particularly corrected.

If the first motor controller 13 transmits the Flag F0 (not matching) and the second motor controller 14 transmits the Flag FY (delay for Y cycles), the calculation timing of the second motor controller 14 delays for Y cycles from the calculation timing of the first motor controller 13. Therefore, in this case, the assigned torque of the right motor 2R calculated by the first motor controller 13 is not corrected, and the assigned torque of the left motor 2L calculated by the second motor controller 14 is replaced with the value of the Y-cycle before.

In the next and subsequent calculation cycles, the calculation by motor controllers 13 and 14 is continued, but until the delayed second motor controller 14 catches up with the first motor controller 13 (i.e., during Y calculation cycles), the first motor controller 13 fixes the value of the assigned torque of the right motor 2R. That is, until the two motor controllers 13 and 14 are synchronized with each other, the forwarding first motor controller 13, which however continues the calculation in the background, will wait, keeping the value of the assigned torque unchanged. After the calculation timing of the second motor controller 14 catches up with that of the first motor controller 13, the above-described synchronous control is performed again.

Similarly, if the second motor controller 14 transmits the Flag F0 (not matching) and the first motor controller 13 transmits the Flag FX (delay for X cycles), the calculation timing of the first motor controller 13 delays for X cycles from the calculation timing of the second motor controller 14. Therefore, in this case, the assigned torque of the left motor 2L calculated by the second motor controller 14 is not corrected, and the assigned torque of the right motor 2R calculated by the first motor controller 13 is replaced with the value of the X-cycle before.

Similarly, in the next and subsequent calculation cycles, the calculation by motor controllers 13 and 14 is continued, but until the delayed first motor controller 13 catches up with the second motor controller 14 (i.e., during X calculation cycles), the second motor controller 14 fixes the value of the assigned torque of the left motor 2L. That is, until the two motor controllers 13 and 14 are synchronized with each other, the forwarding second motor controller 14, which however continues the calculation in the background, will wait, keeping the value of the assigned torque unchanged. After the calculation timing of the first motor controller 13 catches up with that of the second motor controller 14, the above-described synchronous control is performed again.

Signal information except for the above three patterns has a possibility of not being in a case where the calculation timing of either one of the two motor controllers 13 and 14 simply delays. Therefore, in this case, one of the two motor controllers 13 and 14 is set to "main" as the main motor controller 11 in the first embodiment, and motors 2 are controlled using the assigned torques calculated by the main motor controller 13 or 14. Which one of the motor controllers 13 and 14 is set to the main motor controller can be appropriately determined. As one example, a motor controller 13 or 14 which is determined to match as a result of the comparison is set to the main motor controller. Alternatively, a motor controller 13 or 14 having a less delay cycles X or Y may be set to the main motor controller.

The synchronous control described here is merely exemplary and the two motor controllers 13 and 14 are synchronized in a manner except for the above. For example, in the synchronous control, each the motor controllers 13 and 14 may compare not only the assigned torques of the motor 2 that the motor controller itself controls, but also may compare the assigned torques of the counterpart motor 2. Further alternatively, each of motor controllers 13 and 14 may determine only whether or not the two compared assigned torques, transmit and receive signal information representing matching or signal information representing not matching, and control the corresponding motor 2 on the basis of the signal information. In this case, the motor controllers 13 and 14 do not have to store the calculation results for predetermined cycles. Although the description assumes that the signal information is flag information, any signal information that can recognize the result of the determination or the delay cycles X and Y can be used.

2-2. Flow diagram

Figure 11:
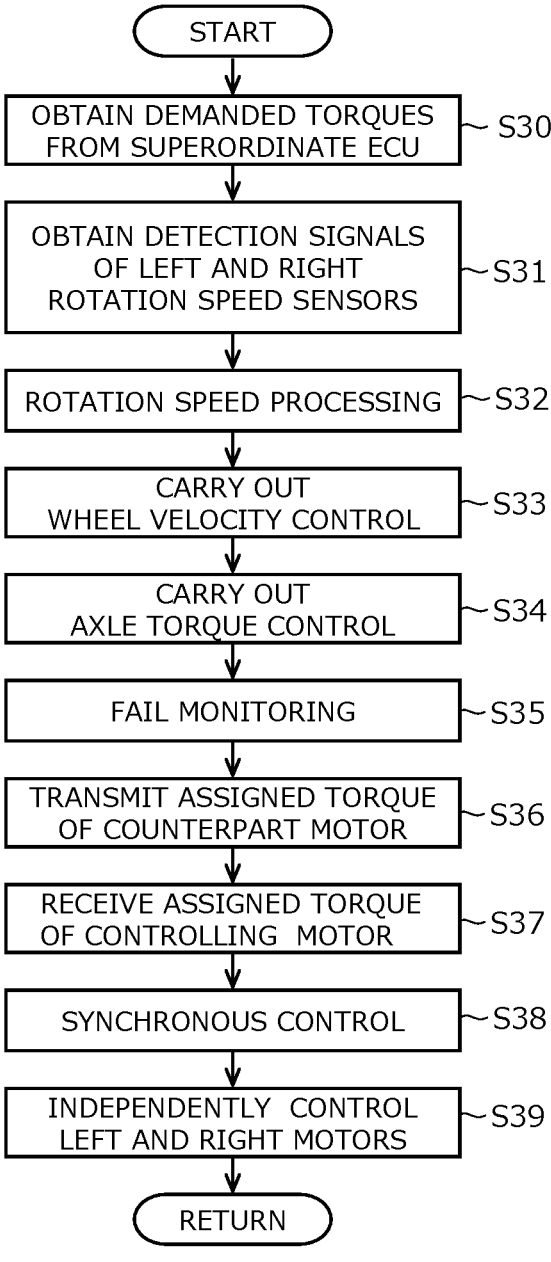
FIG. 11 is an example of a flow diagram executed in each motor controller of FIG. 9.

FIG. 11 is an example of the flow diagram implemented by the motor controllers 13 and 14 of the present embodiment. The superordinate ECU 10 transmits the demanded torques "to the first motor controller 13 and the second motor controller 14" instead of "to the main motor controller 11 and the sub motor controller 12" in Step S3 of the flow diagram of FIG. 7.

As shown in FIG. 11, each of the motor controllers 13 and 14 obtains the demanded torques from the superordinate ECU 10 (Step S30) and obtains the detection signals of the respective rotation speed sensors 26L and 26R (Step S31). Next, each of the motor controllers 13 and 14 carries out a rotation speed process on the motor rotation angular speeds $\omega_{Lm}$ and $\omega_{Rm}$ (Step S32), and carries out the wheel velocity control (Step S33). In this example, each of the motor controllers 13 and 14 further carries out the axle torque control (Step S34) to thereby calculate the assigned torques of the respective motors 2L and 2R.

Next, each of the motor controllers 13 and 14 performs fail monitoring (Step S35). In this fail monitoring, each of the motor controllers 13 and 14 transmits and receives two assigned torques calculated therein to and from the counterpart motor controller 14 or 13, compares the values of the assigned toques, and consequently monitors the occurrence of inconvenience such as a failure of the motor controllers 13 and 14, a failure in the high-speed communication means, and a disconnection of hard wire.

In addition, each of the motor controllers 13 and 14 transmits the assigned torque of the counterpart motor 2 which is not controlled by the motor controller itself (Step S36), receives the assigned torque of the motor 2 which is controlled by the motor controller itself (Step S37), and performs the synchronous control (Step S38). Then, each of the motor controllers 13 and 14 uses the assigned torques of the motor 2 which controlled by the motor controller itself to control this motor 2 (Step S39).

2-3. Action and Effect

Therefore, also in the control system of the present embodiment, like the first embodiment, the two detected signals are inputted into the two motor controllers 13 and 14, and the assigned torques are calculated by both of the two subordinate motor controllers 13 and 14 such that the demanded torques calculated by the superordinate ECU 10 are achieved. In this calculation, since the values of the two signals are used, it is possible to perform precise calculation to compensate for the rotational interference peculiar to the mechanism. Therefore, it is possible to more accurately achieve the demanded torques (for example, left and right driving torques as demand instruction or torque difference between the left and right wheels 5).

In addition, in the present embodiment, both of the motor controllers 13 and 14 perform the equivalent calculation (control) to each calculate the two assigned torques, and transmit and receive the calculation results (the two assigned torques) to each perform the fail monitoring. This makes it possible to perform fail monitoring with presence or absence of the detection signals and/or by comparing information of assigned torques transmitted and received, so that it is possible to further monitor occurrence of a failure, a communication failure, and disconnection of the respective motor controllers 13 and 14.

However, in the control system of the present embodiment, since the assigned torques are calculated by each of the motor controllers 13 and 14, there is a possibility that the calculation timings are shifted as compared with the first embodiment. As a solution to the above, the motor controllers 13 and 14 compare the assigned torque calculated by themselves with the assigned torque received from the counterpart motor controllers 14 and 13, and perform synchronous control. Accordingly, even if the calculation timings of the assigned torques in the motor controllers 13 and 14 are shifted from each other, this configuration can cancel the shift and more accurately achieve the demanded torques.

In particular, in the above-described synchronous control, the motor controllers 13 and 14 each store the past calculation results of predetermined cycles, and if the two compared assigned torques do not match, determine whether or not a value the same as the received assigned torque is present in the past assigned torques stored therein. Then, the motor controllers 13 and 14 transmit signal information based on the result of this determination, and the counterpart motor controllers 14 and 13 receive the signal information. Since the motor controllers 13 and 14 control the motors 2 by referring to the signal information, it is possible to perform synchronous control with higher accuracy and achieve accurate demanded torques.

In relation to the same configuration as the first embodiment, the control system according to the second embodiment can obtain the same effects.

3. Miscellaneous

The configuration of the vehicle 1 described above is exemplary, and is not limited to one described above. For example, the configuration of the power distribution mechanism 3 is not limited to that shown in FIG. 2, and may adapt any mechanisms having various alternative planetary gear mechanism or any mechanisms except for a planetary gear mechanism. In addition, the vehicle may have a configuration to apply the torque difference to the left and right wheels 5 by a differential mechanism not provided with an amplifying function.

The vehicle 1 may be a two-wheel drive (rear wheel drive, front wheel drive) vehicle or a four-wheel drive vehicle. If the vehicle 1 is a four-wheel drive vehicle, it is sufficient that a differential mechanism that applies a torque difference to left and right wheels by two motors is connected to at least front or rear wheels.

DESCRIPTION OF REFERENCE SIGNS

1 vehicle
2 motor (electric motor)
2L left motor
2R right motor
3 power distribution mechanism (differential mechanism)
5 left and right wheels, wheel
7 battery
10 superordinate ECU (superordinate control unit)
11 main motor controller (control unit)
12 sub motor controller (control unit)
13 first motor controller (control unit)

14 second motor controller (control unit)
21 acceleration opening sensor
22 brake sensor
23 steering angle sensor
24 vehicle velocity sensor
25, 25L, 25R wheel velocity sensor
26 rotation speed sensor
26L left rotation speed sensor
26R right rotation speed sensor

The invention claimed is:

1. A control system for a vehicle provided with a differential mechanism that applies a torque difference to left and right wheels and two electric motors coupled to the differential mechanism, the control system comprising:

two control units being connected to each other via high-speed communication means and each controlling one of the two electric motors;

a first rotation speed sensor that detects a first rotation speed of a first electric motor of the two electric motors and outputs the first rotation speed to the two control units;

a second rotation speed sensor that detects a second rotation speed of a second electric motor of the two electric motors and outputs the second rotation speed to the two control units; and a superordinate control unit that calculates demanded torques of the two electric motors based on vehicle information of the vehicle, wherein at least a first control unit of the two control units calculates two assigned torques to achieve the demanded torques calculated in the superordinate control unit based on a detection signal of the first rotation speed sensor and a detection signal of the second rotation speed sensor, the first control unit calculates the two assigned torques based on the two detection signals, controls the first electric motor using a first assigned torque of the two assigned torques, and transmits the first assigned torque and a second assigned torque of the two assigned torques to a second control unit of the two control units via the high-speed communication means, and the second control unit calculates the two assigned torques based on the two detection signals and carries out fail monitoring by comparing the first assigned torque calculated therein and the first assigned torque received from the first control unit and carries out fail monitoring by comparing the second assigned torque calculated therein and the second assigned torque received from the first control unit.

2. The control system according to claim 1, wherein the first control unit is a main control unit, and the second control unit is a sub control unit that controls the second electric motor, using
the second assigned torque transmitted from the main control unit.

3. The control system according to claim 1, wherein
the second control unit controls the second electric motor using the second assigned torque calculated therein, and the control units transmit and receive the two calculated assigned torques calculated in the respective control units to and from each other via the high-speed communication means and carry out fail monitoring.

4. The control system according to claim 3, wherein
each of the control units carries out synchronous control by comparing the calculated assigned torque with the assigned torque received via the high-speed communication means, and each of the control units determines, in the synchronous control, whether or not the two compared assigned torques match, transmits and receives signal information representing a result of the determining, and controls the electric motors by referring to the signal information.

5. The control system according to claim 4, wherein
each of the control units calculates the two assigned torques at a predetermined calculation cycle and stores at least values of the assigned torque of one of the electric motors that the control unit controls of predetermined calculation cycles, in the synchronous control, each of the control units compares the assigned torques of the electric motor that the control units controls, and transmits, if the compared assigned torques match, the signal information representing the matching, determines, if the compared assigned torques do not match, whether or not past assigned torques stored therein includes a value matching the received assigned torque, transmits, if a value matching the received assigned torque is present, the signal information representing the number of cycles tracing back from present time point, and transmits, if a value matching the received assigned torque is not present, the signal information representing that the matching value is not present.

6. The control system according to claim 1, wherein
at least the first control unit carries out axle torque control that includes feedback control using the two detection signals and achieves axle torques corresponding to the demanded torques calculated in the superordinate control unit.

7. The control system according to claim 1, wherein
at least the first control unit carries out wheel velocity control that calculates target wheel velocities of the left and right wheels of the vehicle based on the demanded toques calculated in the superordinate control unit and achieves the target wheel velocities of the left and right wheels, using the two detection signals.

* * * * *